(12) United States Patent
Sha et al.

(10) Patent No.: US 12,207,230 B2
(45) Date of Patent: Jan. 21, 2025

(54) METHODS, APPARATUS AND SYSTEMS FOR CONFIGURING A PAGING RESOURCE IN A WIRELESS COMMUNICATION

(71) Applicant: ZTE CORPORATION, Guangdong (CN)

(72) Inventors: Xiubin Sha, Shenzhen (CN); Bo Dai, Shenzhen (CN); Ting Lu, Shenzhen (CN); Jianxun Ai, Shenzhen (CN); Xu Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 373 days.

(21) Appl. No.: 17/854,672

(22) Filed: Jun. 30, 2022

(65) Prior Publication Data

US 2022/0400466 A1 Dec. 15, 2022

Related U.S. Application Data

(63) Continuation of application No. PCT/CN2020/070233, filed on Jan. 3, 2020.

(51) Int. Cl.
*H04W 68/02* (2009.01)
*H04W 48/08* (2009.01)

(52) U.S. Cl.
CPC .......... *H04W 68/02* (2013.01); *H04W 48/08* (2013.01)

(58) Field of Classification Search
CPC ..... H04W 48/04; H04W 48/08; H04W 48/16; H04W 8/10; H04W 8/186; H04W 8/20;
(Continued)

(56) References Cited

U.S. PATENT DOCUMENTS 10,873,924 B2 * 12/2020 Yu .......................... H04W 68/02
11,337,143 B2 * 5/2022 Berggren ............ H04W 68/005
(Continued)

FOREIGN PATENT DOCUMENTS

CN 109076480 12/2018
EP 3 125 592 2/2017
(Continued)

OTHER PUBLICATIONS

Huawei. "TR 24 801. CTI open Issues related to tracking area concept" 3GPP TSG CI WGI Meeting #46 c1-070831, May 30, 2007 (May 30, 2007).
(Continued)

*Primary Examiner* — Siu M Lee
(74) *Attorney, Agent, or Firm* — Foley & Lardner LLP

(57) ABSTRACT

Methods, apparatus and systems for configuring a paging resource in a wireless communication are disclosed. In one embodiment, a method performed by a wireless communication device is disclosed. The method comprises: receiving a first message from a wireless communication node, wherein the first message comprises information about a plurality of tracking area codes (TACs) and a plurality of TAC characteristics; transmitting a second message to the wireless communication node, wherein the second message includes a TAC that is selected from the plurality of TACs based on at least one of the plurality of TAC characteristics of the wireless communication device; and receiving a third message within the TAC, wherein the TAC comprises at least one cell.

16 Claims, 11 Drawing Sheets

(58) Field of Classification Search
CPC ..... H04W 76/11; H04W 88/18; H04W 68/02; H04W 68/04; H04W 48/10; H04W 48/12; H04W 60/00; H04W 8/02; H04W 24/08; H04W 72/21; Y02D 30/70
See application file for complete search history.

(56) References Cited

U.S. PATENT DOCUMENTS

| | | | |
|---|---|---|---|
| 11,864,212 B2* | 1/2024 | Sha | H04W 24/08 |
| 2017/0064670 A1* | 3/2017 | Shen | H04W 4/70 |
| 2018/0270792 A1 | 9/2018 | Park et al. | |
| 2020/0178291 A1* | 6/2020 | Sha | H04W 72/23 |
| 2021/0058217 A1* | 2/2021 | Liu | H04W 48/12 |

FOREIGN PATENT DOCUMENTS

| | | |
|---|---|---|
| WO | WO-2015/147602 A1 | 10/2015 |
| WO | WO-2018/126955 A1 | 7/2018 |
| WO | WO-2019/179498 A1 | 9/2019 |

OTHER PUBLICATIONS

International Search Report and Written Opinion for application No. PCT/CN2020/070233 DTD Oct. 10, 2020.
Samsung. "Discussion on Configuration of tracking area" 3GPP TSG-RAN WG2#51 meeting R2-060620, Feb. 18, 2006 (Feb. 18, 2006) section 2.4 Figure 4.
Extended European Search Report for EP Appl. No. 20888449.4, dated Mar. 2, 2023 (12 pages).
First Office Action on CN Appl. No. 202080091187.4, dated Apr. 27, 2023 (with English translation, 16 pages).

* cited by examiner

METHODS, APPARATUS AND SYSTEMS FOR CONFIGURING A PAGING RESOURCE IN A WIRELESS COMMUNICATION

TECHNICAL FIELD

The disclosure relates generally to wireless communications and, more particularly, to methods, apparatus and systems for configuring a paging resource in a wireless communication.

BACKGROUND

In a wireless communication following a current standard, e.g. in a fifth-generation (5G) new radio (NR) system, the network side does not sense the mobility of a user equipment (UE) with an idle mode in a range identified by a tracking area code (TAC). When the network side wants to send downlink data to the idle mode UE, the network side will send a paging message through a paging common search space to wake up the UE, within the TAC range.

In an existing wireless communication system, all UEs within the TAC need to monitor the common search space to which the paging belongs. A UE will not know whether the paging message is with respect to the UE itself, until the UE resolves the UE identity in the paging message, which requires the UE to resolve the physical downlink control channel (PDCCH) and the physical downlink shared channel (PDSCH) related to the paging message. This increases the probability that an idle mode UE is mistakenly awakened by paging, and induces a large power consumption of the UE. Although some paging optimization is supported in some existing wireless communication systems, it cannot prevent a UE from monitoring paging of other UEs, which causes the problems of false wake-up and high power consumption.

Thus, existing systems and methods for configuring a paging resource in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: receiving a first message from a wireless communication node, wherein the first message comprises information about a plurality of tracking area codes (TACs) and a plurality of TAC characteristics; transmitting a second message to the wireless communication node, wherein the second message includes a TAC that is selected from the plurality of TACs based on at least one of the plurality of TAC characteristics of the wireless communication device; and receiving a third message within the TAC, wherein the TAC comprises at least one cell.

In another embodiment, a method performed by a wireless communication device is disclosed. The method comprises: transmitting a first message to a wireless communication node, wherein the first message comprises information related to TAC characteristics of the wireless communication device; receiving a second message from the wireless communication node, wherein the second message comprises information about a paging resource configuration for the wireless communication device; and receiving a third message based on the paging resource configuration.

In a further embodiment, a method performed by a wireless communication node is disclosed. The method comprises: transmitting a first message to a wireless communication device, wherein the first message comprises information about a plurality of tracking area codes (TACs) and a plurality of TAC characteristics; receiving a second message from the wireless communication device, wherein the second message includes a TAC that is selected from the plurality of TACs based on at least one of the plurality of TAC characteristics of the wireless communication device; and transmitting a third message within the TAC, wherein the TAC comprises at least one cell.

In another embodiment, a method performed by a wireless communication node is disclosed. The method comprises: receiving a first message from a wireless communication device, wherein the first message comprises information related to TAC characteristics of the wireless communication device; transmitting a second message to the wireless communication device, wherein the second message comprises information about a paging resource configuration for the wireless communication device; and transmitting a third message based on the paging resource configuration.

In a different embodiment, a wireless communication node configured to carry out a disclosed method in some embodiment is disclosed. In yet another embodiment, a wireless communication device configured to carry out a disclosed method in some embodiment is disclosed. In still another embodiment, a non-transitory computer-readable medium having stored thereon computer-executable instructions for carrying out a disclosed method in some embodiment is disclosed. The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
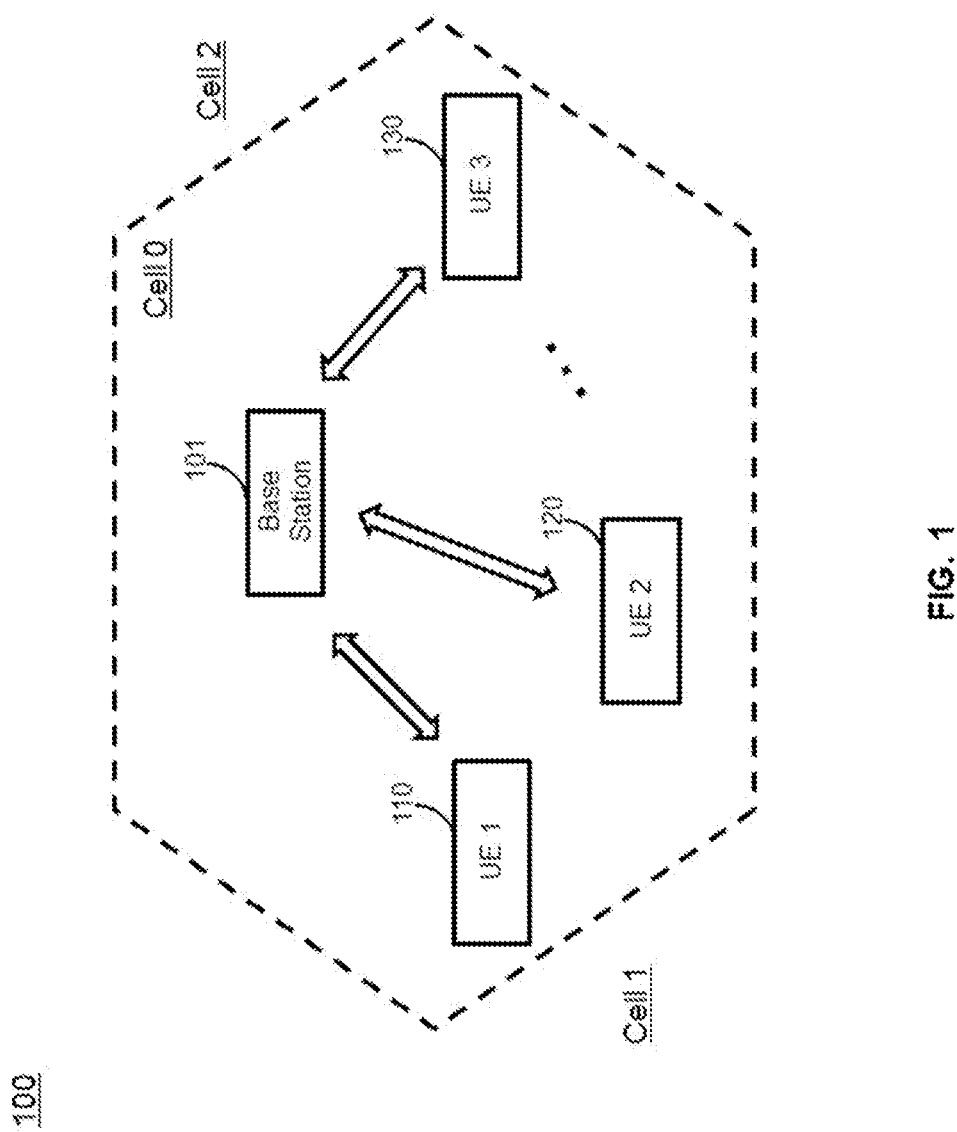
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. Paging is a method of a BS for delivering a message to a UE whose exact whereabouts are unknown. The present teaching provides methods and systems for reducing false wake-up probabilities and power consumption caused when a UE monitors paging of other UEs, e.g. by configuring paging resources reasonably.

In one embodiment, multiple tracking area codes (TACs) are configured based on a plurality of TAC characteristics. A UE can select one of the TACs associated with its paging message based on the TAC characteristics of the UE. The TAC characteristics of the UE comprises at least one of the following: an indication that the UE is stationary; an indication that the UE is slowly moving; a movement trajectory of the UE; historical cells passed by the UE; a movement direction of the UE; a movement speed of the UE; and a type of service of the UE. The TAC characteristics of the UE may be utilized to estimate information related to at least one of: a range for paging the UE; a position of the UE; a type of the UE (e.g. a NR Light UE, a coverage enhancement type UE, or a UE with time sensitive network (TSN) service); a TAC type; and a terminal type.

In another embodiment, a BS configures different paging resources to UEs with different TAC characteristics, via UE specific signaling. The paging resources comprises information related to at least one of: a first search space of the UE; a radio network temporary identifier (RNTI) used in the first search space; a second search space of the UE; and a radio network temporary identifier (RNTI) used in the second search space.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a core network, a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes multiple neighbor cells, Cell 0, Cell 1 and Cell 2. Cell 0 includes a base station (BS) 101 and a plurality of UEs, UE 1 110, UE 2 120 ... UE 3 130, where the BS 101 can communicate with the UEs according to wireless protocols within the Cell 0. A UE may just enter the Cell 0, e.g. from Cell 1, or may have been in an idle mode for a while in the Cell 0. It that case, a paging process is performed before the UE can communicate service data with the BS 101. For example, a paging message may be transmitted by the BS 101 and detected by the UE to establish a service connection between the UE and the BS 101, or say to wake up the UE. Methods and systems will be discussed in details below for reducing false wake-up probabilities and power consumption during a paging process of a UE.

Figure 2:
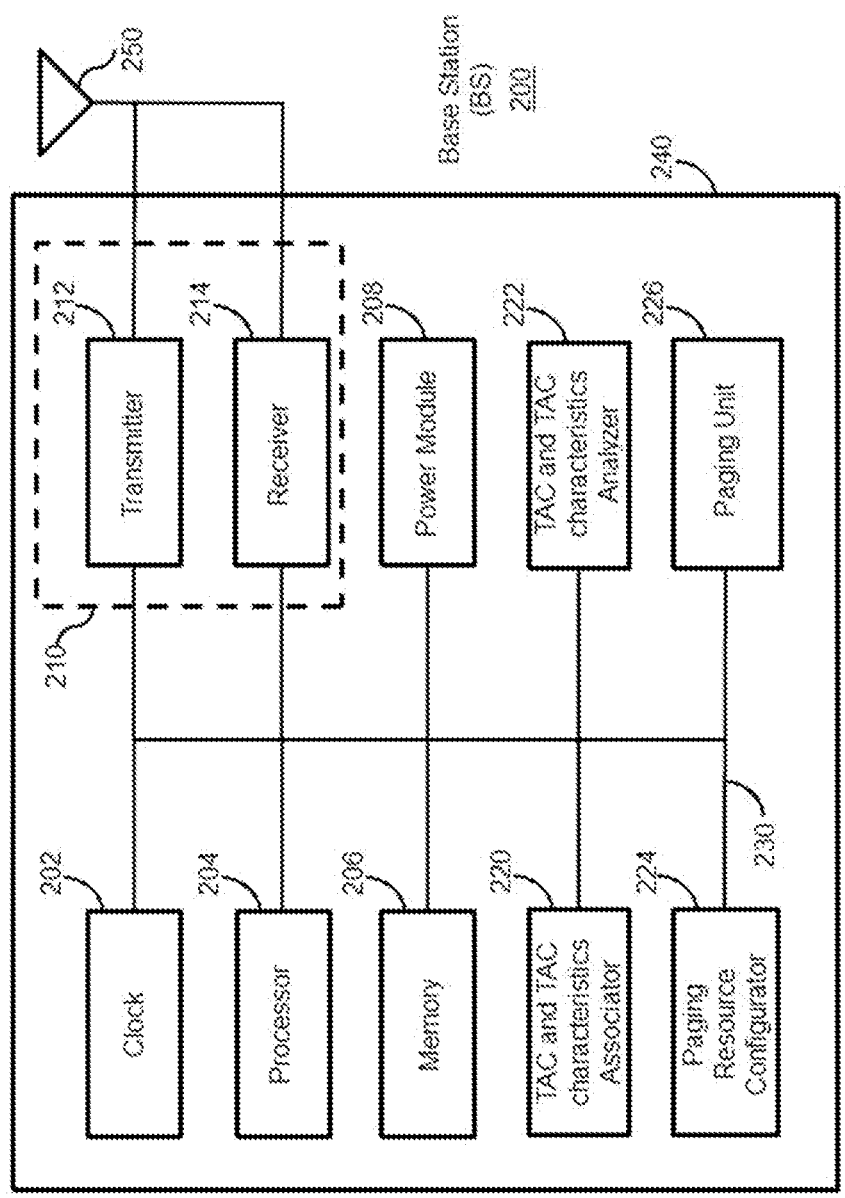
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a TAC and TAC characteristics associator 220, a TAC and TAC characteristics analyzer 222, a paging resource configurator 224, and a paging unit 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the TAC and TAC characteristics associator 220 in the BS 200 may determine a plurality of tracking area codes (TACs) and a plurality of related TAC characteristics, e.g. by generating a mapping between the plurality of TACs and the plurality of TAC characteristics. The TAC and TAC characteristics associator 220 may then transmit, via the transmitter 212 to a UE, a first message that comprises information about the relationship between the plurality of TACs and the plurality of TAC characteristics. In one embodiment, the first message comprises a system information block (SIB) that is broadcasted to a plurality of UEs associated with the BS 200.

The TAC and TAC characteristics analyzer 222 in this example may receive, via the receiver 214 from the UE, a second message that includes a TAC. The TAC may be selected by the UE from the plurality of TACs based on at least one of the plurality of TAC characteristics of the UE. In one embodiment, the second message comprises a non-access stratum (NAS) signaling that comprises at least one of: an attach request, a tracking area update request, or a registration request. The TAC and TAC characteristics analyzer 222 may analyze the second message and send information about the selected TAC to the paging unit 226 for paging.

In one embodiment, the second message is generated by the UE based on: determining the at least one of the plurality of TAC characteristics of the UE; and incorporating information about the at least one of the plurality of TAC characteristics of the UE into the second message. In another embodiment, the second message is generated by the UE based on: determining the at least one of the plurality of TAC characteristics of the UE; selecting one of the plurality of TACs based on the at least one of the plurality of TAC characteristics of the UE; and incorporating information about the selected TAC into the second message. In one embodiment, the plurality of TAC characteristics of the UE comprise information related to at least one of: whether the UE is stationary; whether the UE has a slow movement; a movement path of the UE; historical cells passed by the UE; a movement direction of the UE; a movement speed of the UE; and a type of service carried by the UE.

The paging unit 226 in this example may transmit, via the transmitter 212, a third message within the selected TAC. The third message may be a paging message. The selected TAC may comprise one or more cells associated with the UE. In one example, when the UE is stationary, the third message is transmitted merely in a cell where the UE is located. In another example, when the UE is moving, the TAC covers multiple cells, and the third message is transmitted in all cells covered by the TAC. In yet another example, when the UE has a specific moving path, the third message is transmitted in a target cell of the UE.

In a different embodiment, the TAC and TAC characteristics analyzer 222 may receive, via the receiver 214 from a UE, a first message that comprises information related to TAC characteristics of the UE. In various examples, the first message may comprise: an access stratum (AS) signaling, a medium access control channel element (MAC CE), or a non-access stratum (NAS) signaling. In one example, the AS signaling comprises at least one of: a UE connection release request, a UE connection release confirmation, a radio resource control (RRC) message, a capability information of the UE, an auxiliary information of the UE. The TAC and TAC characteristics analyzer 222 may analyze the first message and send the information related to TAC characteristics of the UE to the paging resource configurator 224 for paging resource configuration.

The information related to TAC characteristics of the UE may comprise information related to at least one of: whether the UE is stationary; whether the UE has a slow movement; a movement path of the UE; historical cells passed by the UE; a movement direction of the UE; a movement speed of the UE; a type of service carried by the UE; a position of the UE; an indication that the UE is coverage enhancement (CE) restricted; an indication that the UE is CE-ModeB restricted; an indication that the UE is with lower power class; an indication that the UE is a reduced capability NR device; an indication that the UE is a time sensitive communication (TSC) device; an indication that the UE is a device supporting CE or in CE; a TAC identification; a type or class identification of the UE; an identification of a strongest neighbor cell of the UE; a prediction information of a moving path of the UE; and historical information of connection states of the UE. The reduced capability NR device may be: a NR UE with a reduced number of transmit and receiving antennas, a UE with bandwidth reduction, a UE with half-duplex frequency division duplex (FDD), a UE with relaxed UE processing time, or a UE with relaxed UE processing capability. In one embodiment, the information related to TAC characteristics of the UE is utilized to estimate information related to a range for paging associated with the UE.

The paging resource configurator 224 may generate a paging resource configuration for the UE based on the information related to TAC characteristics of the UE. In various embodiments, the paging resource configuration may comprise information related to at least one of: a first search space of the UE; a radio network temporary identifier (RNTI) associated with the first search space; a second search space of the UE; and a radio network temporary identifier (RNTI) associated with the second search space. In one embodiment, for each of the first search space and the second search space, the paging resource configuration comprises information related to at least one of: a starting position for the UE to monitor a physical downlink control channel (PDCCH) in the search space; a maximum number of repetitions of the PDCCH; a time interval for the UE to monitor the PDCCH in the search space; and information for determining the time interval.

The paging resource configurator 224 can transmit, via the transmitter 212 to the UE, a second message that comprises information about the paging resource configuration for the UE. For example, the second message comprises a signaling specific to the UE. The paging resource configurator 224 may also send the paging resource configuration to the paging unit 226 for paging the UE.

The paging unit 226 may transmit, via the transmitter 212 to the UE, a third message based on the paging resource configuration. For example, the third message comprises a paging message. In one embodiment, the third message is transmitted to the UE when the UE monitors a PDCCH in the first search space. The UE monitors a PDCCH in the second search space based on an indication carried by at least one of: the third message and a physical downlink shared channel (PDSCH) scheduled in the first search space. A starting position for the UE to monitor the PDCCH in the second search space may be determined based on at least one of: a starting position of a subsequent first search space when no PDCCH was detected in the first search space by the UE; an end position of the subsequent first search space; an end position for the UE to monitor a message transmitted on a scheduling resource in the subsequent first search space; and a predetermined time offset.

In another embodiment, the TAC and TAC characteristics analyzer 222 may receive, via the receiver 214 from the UE, a fourth message that comprises updated information related to the TAC characteristics of the UE. The paging resource configurator 224 may transmit, via the transmitter 212 to the UE, a fifth message that comprises information about an updated paging resource configuration for the UE. The paging unit 226 will perform a paging process based on the updated paging resource configuration.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the TAC and TAC characteristics analyzer 222. Conversely, each of the modules illustrated in FIG. 2 can be implemented using a plurality of separate components or elements.

Figure 3A:
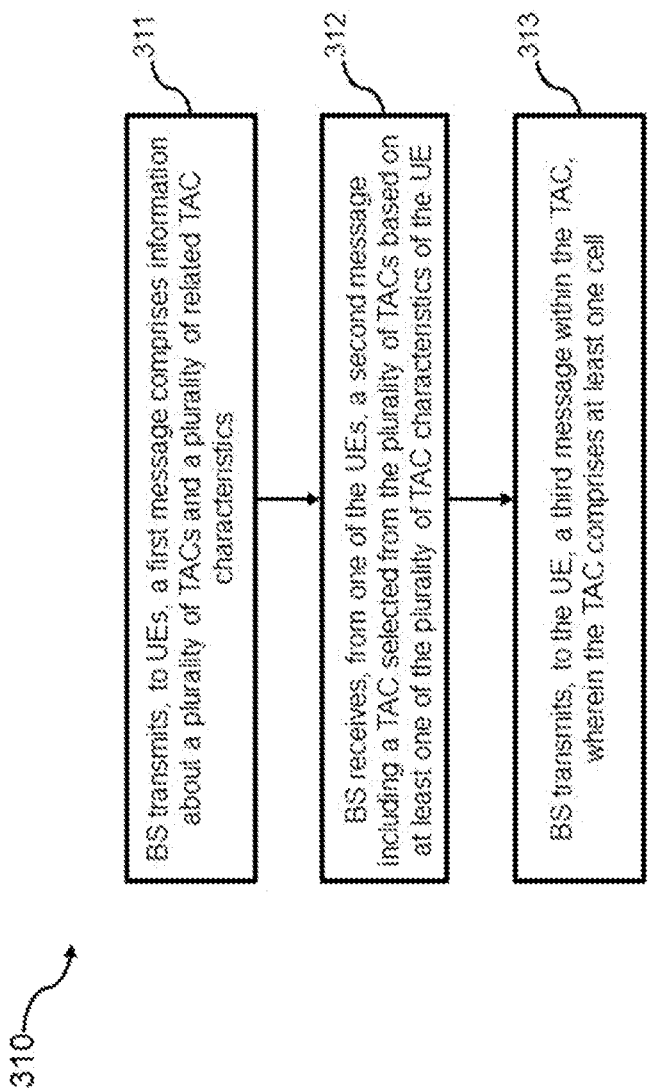
FIG. 3A and FIG. 3B illustrate flow charts of methods performed by a BS for paging resource configuration, in accordance with some embodiments of the present disclosure.

FIG. 3A illustrates a flow chart for a method 310 performed by a BS, e.g. the BS 200 in FIG. 2, for paging resource configuration, in accordance with some embodiments of the present disclosure. At operation 311, the BS transmits, to UEs, a first message comprises information about a plurality of TACs and a plurality of related TAC characteristics. At operation 312, the BS receives, from one of the UEs, a second message including a TAC selected from the plurality of TACs based on at least one of the plurality of TAC characteristics of the UE. At operation 313, the BS transmits, to the UE, a third message within the TAC, wherein the TAC comprises at least one cell. The order of the steps shown in FIG. 3A may be changed according to different embodiments of the present disclosure.

Figure 3B:
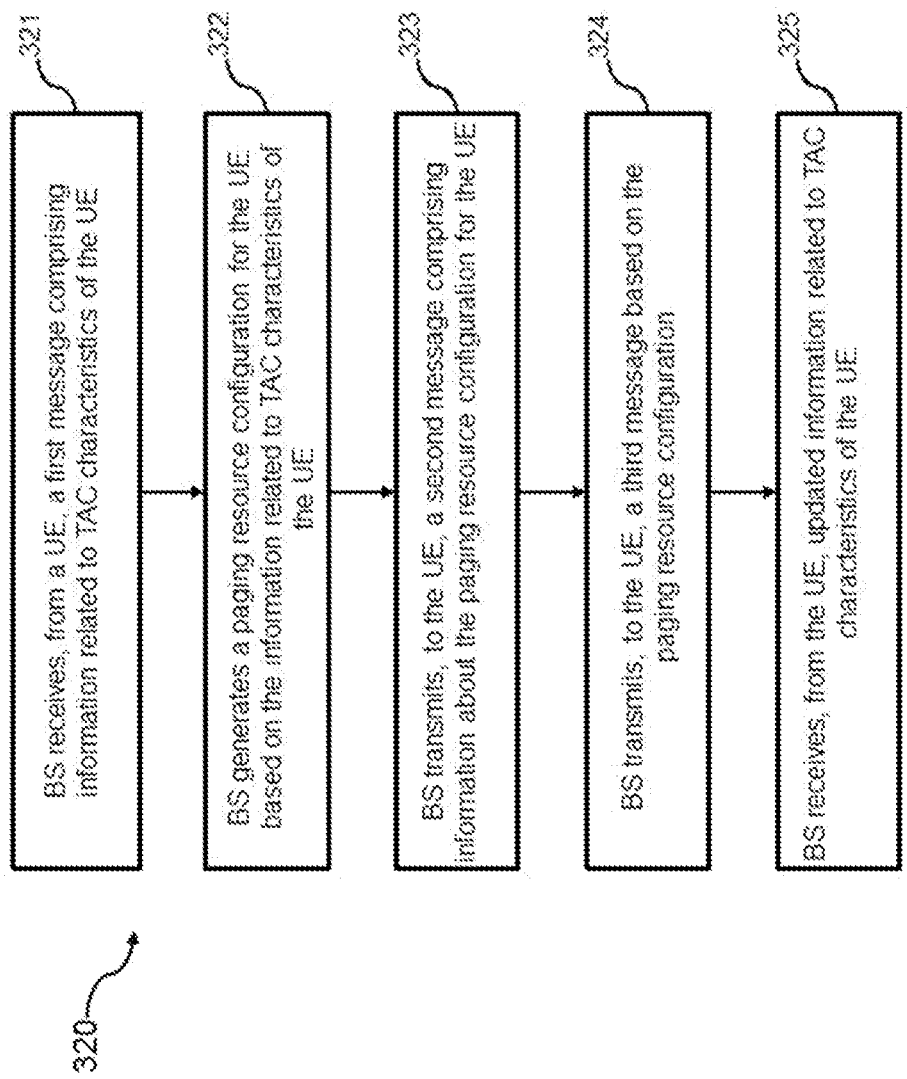

FIG. 3B illustrates a flow chart for another method 320 performed by a BS, e.g. the BS 200 in FIG. 2, for paging resource configuration, in accordance with some embodiments of the present disclosure. At operation 321, the BS receives, from a UE, a first message comprising information related to TAC characteristics of the UE. At operation 322, the BS generates a paging resource configuration for the UE based on the information related to TAC characteristics of the UE. At operation 323, the BS transmits, to the UE, a second message comprising information about the paging resource configuration for the UE. At operation 324, the BS transmits, to the UE, a third message based on the paging resource configuration. Optionally at operation 325, the BS receives, from the UE, updated information related to TAC characteristics of the UE. The order of the steps shown in FIG. 3B may be changed according to different embodiments of the present disclosure.

Figure 4:
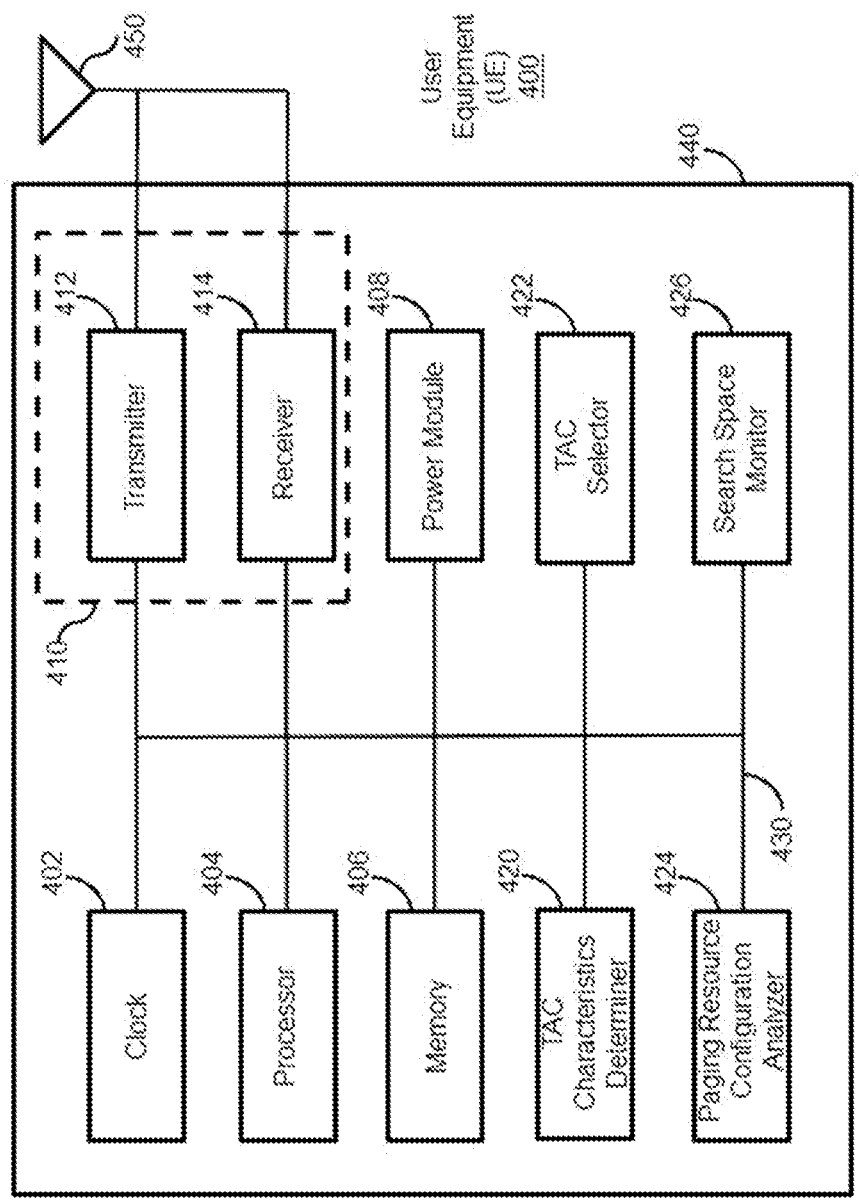
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a TAC characteristics determiner 420, a TAC selector 422, a paging resource configuration analyzer 424, and a search space monitor 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The TAC characteristics determiner 420 in this example may determine at least one of a plurality of TAC characteristics of the UE 400 itself. In one embodiment, the plurality of TAC characteristics of the UE comprise information related to at least one of: whether the UE is stationary; whether the UE has a slow movement; a movement path of the UE; historical cells passed by the UE; a movement direction of the UE; a movement speed of the UE; and a type of service carried by the UE.

The TAC selector 422 in this example may receive, via the receiver 414 from a BS, a first message that comprises information about a relationship between a plurality of tracking area codes (TACs) and a plurality of TAC characteristics, e.g. about a mapping between the plurality of TACs and value ranges of the plurality of TAC characteristics.

The TAC selector 422 may then transmit, via the transmitter 412 to the BS, a second message. In one embodiment, the TAC selector 422 incorporates information about the at least one of the plurality of TAC characteristics of the UE 400 into the second message. In another embodiment, the TAC selector 422 selects one of the plurality of TACs based on the at least one of the plurality of TAC characteristics of the UE 400; and incorporates information about the selected TAC into the second message.

In one embodiment, the first message comprises a system information block (SIB) that is broadcasted to a plurality of UEs including the UE 400. In one embodiment, the second message comprises a non-access stratum (NAS) signaling that comprises at least one of: an attach request, a tracking area update request, or a registration request. The TAC selector 422 may also send information about the selected TAC to the search space monitor 426 for search space monitoring and receiving a paging message.

The search space monitor 426 in this example may monitor search spaces. While monitoring a search space, the search space monitor 426 may receive, via the receiver 414, a third message within the selected TAC. The third message may be a paging message. The selected TAC may comprise one or more cells associated with the UE. In one example, when the UE is stationary, the third message is monitored merely in a cell where the UE is located. In another example, when the UE is moving, the TAC covers multiple cells, and the third message is monitored in all cells covered by the TAC. In yet another example, when the UE has a specific moving path, the third message is monitored in a target cell or possible target cells of the UE.

In a different embodiment, the TAC characteristics determiner 420 may determine information related to TAC characteristics of the UE. For example, the information related to TAC characteristics of the UE may comprise information related to at least one of: whether the UE is stationary; whether the UE has a slow movement; a movement path of the UE; historical cells passed by the UE; a movement direction of the UE; a movement speed of the UE; a type of service carried by the UE; a position of the UE; an indication that the UE is coverage enhancement (CE) restricted; an indication that the UE is CE-ModeB restricted; an indication that the UE is with lower power class; an indication that the UE is a reduced capability NR device; an indication that the UE is a time sensitive communication (TSC) device; an indication that the UE is a device supporting CE or in CE; a TAC identification; a type or class identification of the UE; an identification of a strongest neighbor cell of the UE; a prediction information of a moving path of the UE; and historical information of connection states of the UE. The reduced capability NR device may be: a NR UE with a reduced number of transmit and receiving antennas, a UE with bandwidth reduction, a UE with half-duplex FDD, a UE with relaxed UE processing time, or a UE with relaxed UE processing capability. In one embodiment, the information related to TAC characteristics of the UE is utilized to estimate information related to a range for paging associated with the UE.

The TAC characteristics determiner 420 in this embodiment may transmit, via the transmitter 412 to a BS, a first message that comprises information related to TAC characteristics of the UE 400. The paging resource configuration analyzer 424 may receive, via the receiver 414 from the BS, a second message comprises information about a paging resource configuration for the UE. In various examples, the first message may comprise: an access stratum (AS) signaling, a medium access control channel element (MAC CE), or a non-access stratum (NAS) signaling. In one example, the AS signaling comprises at least one of: a UE connection release request, a UE connection release confirmation, a radio resource control (RRC) message, a capability information of the UE, an auxiliary information of the UE. For example, the second message comprises a signaling specific to the UE.

The paging resource configuration analyzer 424 may analyze the paging resource configuration and send the paging resource configuration to the search space monitor 426 for search space monitoring. In various embodiments, the paging resource configuration may comprise information related to at least one of: a first search space of the UE; a radio network temporary identifier (RNTI) associated with the first search space; a second search space of the UE; and a radio network temporary identifier (RNTI) associated with the second search space. In one embodiment, for each of the first search space and the second search space, the paging resource configuration comprises information related to at least one of: a starting position for the UE to monitor a physical downlink control channel (PDCCH) in the search space; a maximum number of repetitions of the PDCCH; a time interval for the UE to monitor the PDCCH in the search space; and information for determining the time interval.

The search space monitor 426 may monitor search space and receive, via the receiver 414 from the BS, a third message based on the paging resource configuration. For example, the third message comprises a paging message. In one embodiment, the search space monitor 426 monitors a PDCCH in the first search space, wherein the third message is received based on monitoring the PDCCH. The search space monitor 426 then monitors a PDCCH in the second search space based on an indication carried by at least one of: the third message or a physical downlink shared channel (PDSCH) scheduled in the first search space. A starting position for monitoring the PDCCH in the second search space may be determined based on at least one of: a starting position of a subsequent first search space when no PDCCH was detected in the first search space by the UE; an end position of the subsequent first search space; an end position of monitoring a message transmitted on a scheduling resource in the subsequent first search space; and a predetermined time offset.

In another embodiment, the TAC characteristics determiner 420 may transmit, via the transmitter 412 to the BS, a fourth message that comprises updated information related to the TAC characteristics of the UE. The paging resource configuration analyzer 424 may receive, via the receiver 414 from the BS, a fifth message that comprises information about an updated paging resource configuration for the UE. The search space monitor 426 will then monitor the search spaces and perform a paging process based on the updated paging resource configuration.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the TAC characteristics determiner 420. Conversely, each of the modules illustrated in FIG. 4 can be implemented using a plurality of separate components or elements.

Figure 5A:
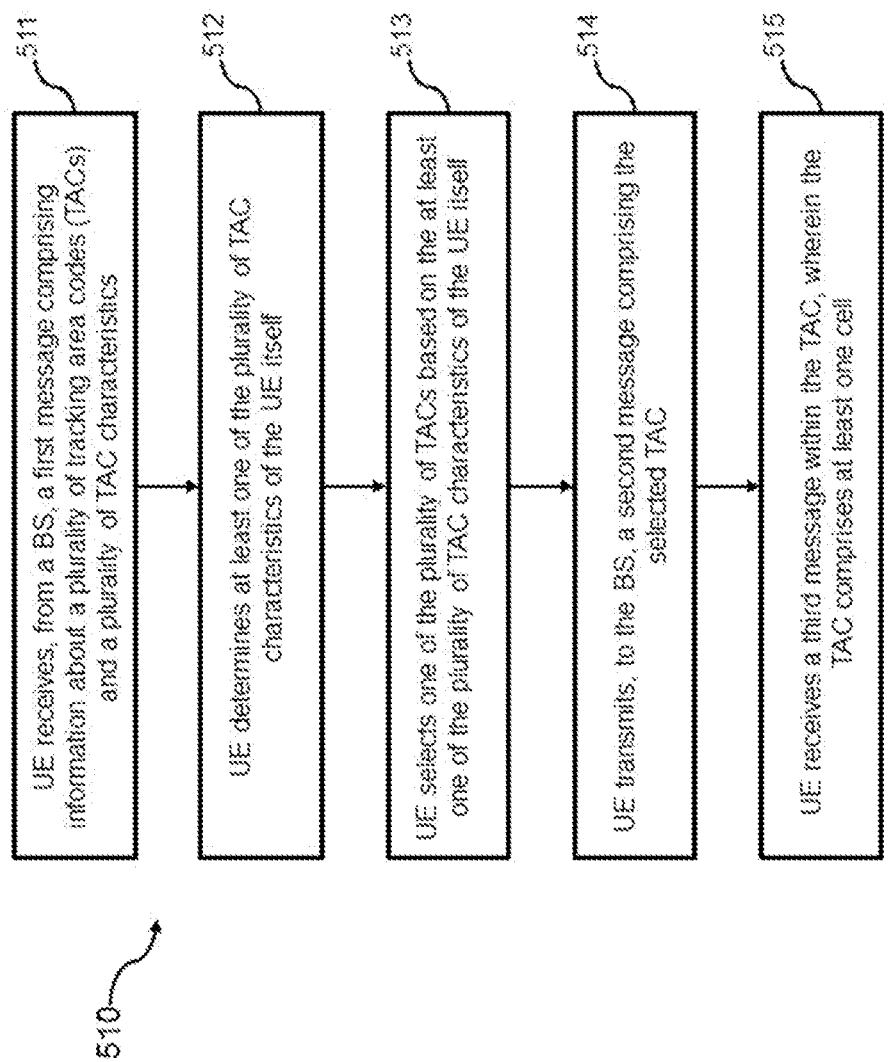
FIG. 5A and FIG. 5B illustrate flow charts of methods performed by a UE for paging resource configuration, in accordance with some embodiments of the present disclosure.

FIG. 5A illustrates a flow chart for a method 510 performed by a UE, e.g. the UE 400 in FIG. 4, for paging resource configuration, in accordance with some embodiments of the present disclosure. At operation 511, the UE receives, from a BS, a first message comprising information about a plurality of tracking area codes (TACs) and a plurality of TAC characteristics. At operation 512, the UE determines at least one of the plurality of TAC characteristics of the UE itself. At operation 513, the UE selects one of the plurality of TACs based on the at least one of the plurality of TAC characteristics of the UE itself. At operation 514, the UE transmits, to the BS, a second message comprising the selected TAC. At operation 515, the UE receives a third message within the TAC, wherein the TAC comprises at least one cell. The order of the steps shown in FIG. 5A may be changed according to different embodiments of the present disclosure.

Figure 5B:
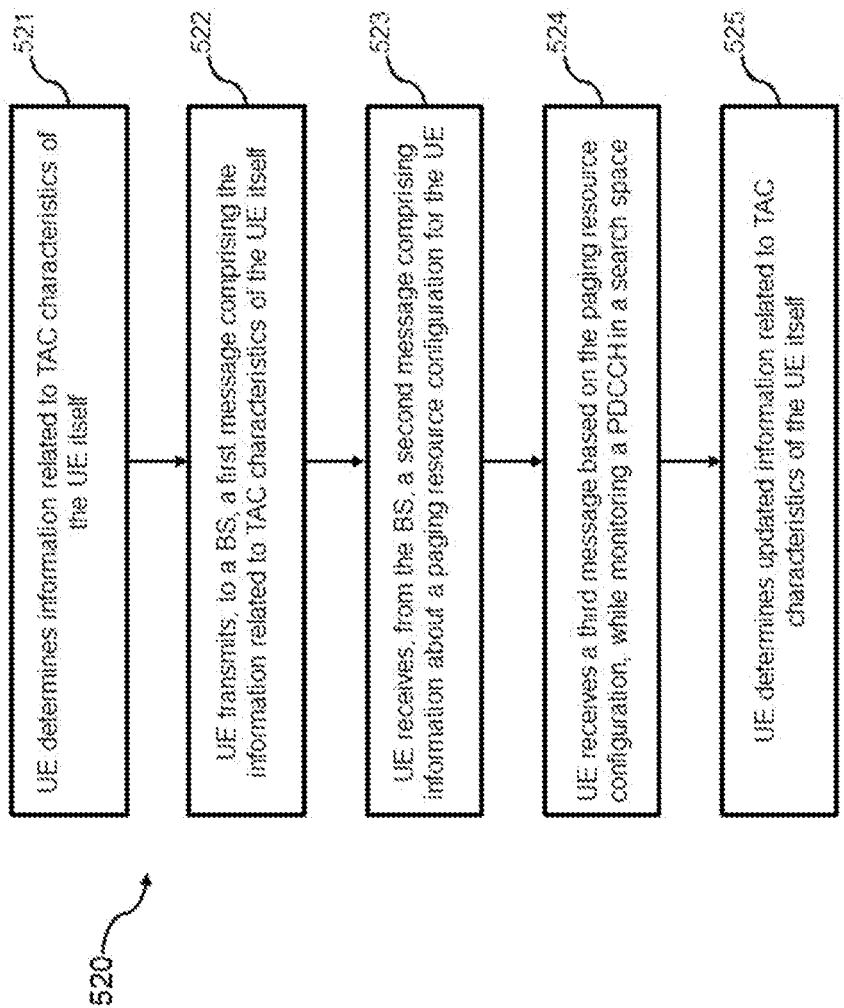

FIG. 5B illustrates a flow chart for another method 520 performed by a UE, e.g. the UE 400 in FIG. 4, for paging resource configuration, in accordance with some embodiments of the present disclosure. At operation 521, the UE determines information related to TAC characteristics of the UE itself. At operation 522, the UE transmits, to a BS, a first message comprising the information related to TAC characteristics of the UE itself. At operation 523, the UE receives, from the BS, a second message comprising information about a paging resource configuration for the UE. At operation 524, the UE receives a third message based on the paging resource configuration, while monitoring a PDCCH in a search space. At operation 525, the UE determines updated information related to TAC characteristics of the UE itself. The order of the steps shown in FIG. 5B may be changed according to different embodiments of the present disclosure.

Different embodiments of the present disclosure will now be described in detail hereinafter. It is noted that the features of the embodiments and examples in the present disclosure may be combined with each other in any manner without conflict.

In a first embodiment, multiple TACs are configured based on TAC characteristics. A base station may configure different TACs based on different TAC characteristics of UEs for paging the UEs. For example, for a fast-moving UE, the BS may configure a TAC having a large coverage area or a large number of cells. For a slow-moving UE, the BS may configure a TAC having a small coverage area or a small number of cells. For a stationary UE, the BS may configure a TAC merely having the cell covering the UE. The BS may page each UE merely within the TAC configured for the UE.

Figure 6:
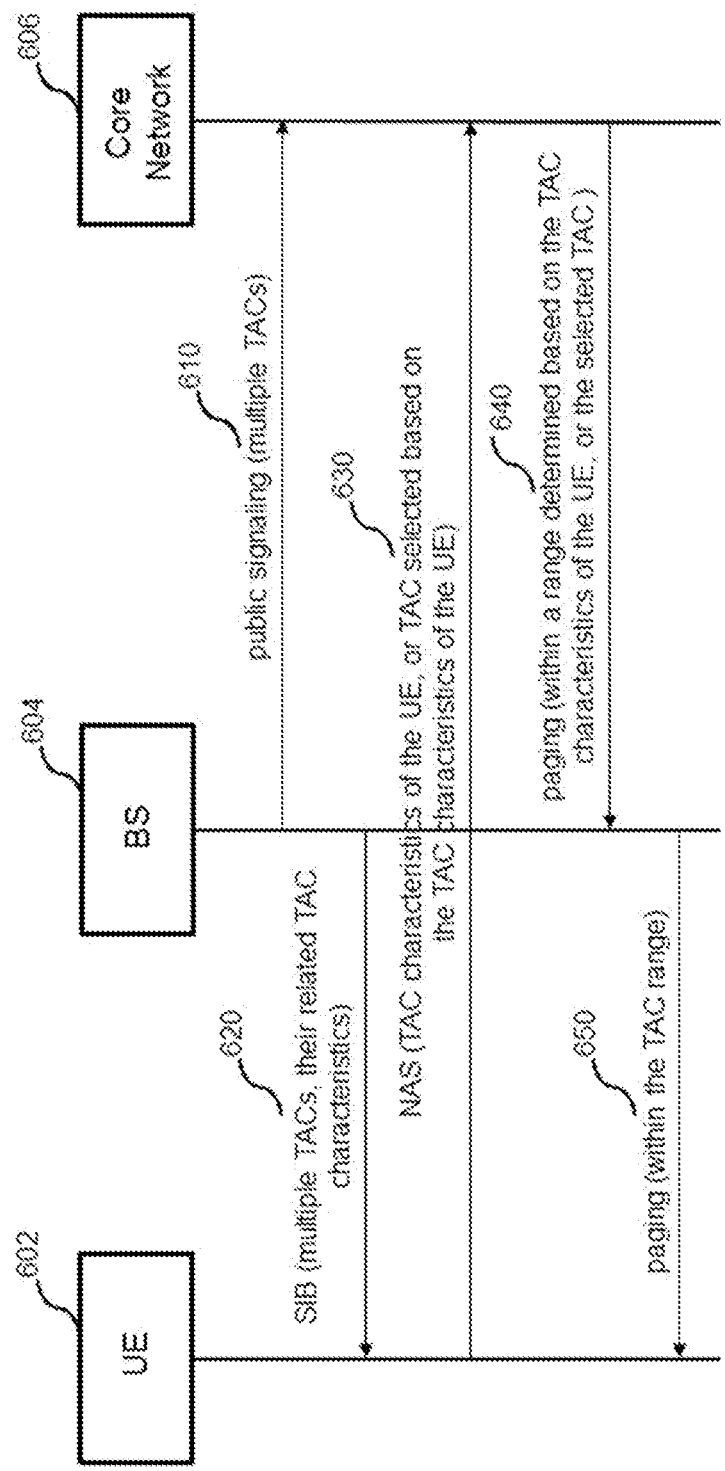
FIG. 6 illustrates an exemplary method for paging resource configuration based on tracking area code (TAC) selection, in accordance with some embodiments of the present disclosure.

FIG. 6 illustrates an exemplary method for paging resource configuration based on tracking area code (TAC) selection, in accordance with some embodiments of the present disclosure. As shown in FIG. 6, the base station 604 transmits multiple TACs configured based on TAC characteristics to the core network 606 through some public signaling, e.g. S1 or Ng Interface Management Messages, at operation 610. Then at operation 620, the base station 604 transmits a broadcast message, e.g. a system information block (SIB), to UEs, e.g. the UE 602. The broadcast message may carry a plurality of TACs configured based on the TAC characteristics and carry the TAC characteristics related to the plurality of TACs.

At operation 630, the UE 602 may send a report to the core network 606 via a NAS signaling. The NAS signaling may carry the paging-related characteristics of the UE 602 or carry a TAC selected based on the TAC characteristics of the UE 602. The UE 602 may also select the TAC based on other predetermined principles, and report the selected TAC to the core network 606. The NAS signaling may include at least one of the following: an initial attach request, a tracking area update request, and a registration request.

At operation 640, the core network 606 initiates a paging to the UE 602. The paging may be performed based on the paging related characteristics information of the UE 602, or within the TAC selected by the UE. The core network 606 then transmits a paging message to a base station associated with each cell in the TAC. For example, for a static or stationary UE, the paging is performed merely with an original cell where the UE is located. For a moving UE, the paging is performed in the range of the TAC selected by the UE. For a UE having a specific moving path or trajectory, the paging is performed in a target residing cell of the UE.

At operation 650, the base station 604 performs the paging by transmitting the paging message to the UE 602, based on the paging related characteristics information of the UE 602, or within the TAC selected by the UE.

The TAC characteristics of the UE comprises at least one of the following: an indication that the UE is stationary; an indication that the UE is slowly moving; a movement trajectory of the UE; historical cells passed by the UE; a movement direction of the UE; a movement speed of the UE; and a type of service of the UE. The TAC characteristics of the UE may be utilized to estimate information related to at least one of: a range for paging the UE; a position of the UE; a type of the UE (e.g. a NR Light UE, a coverage enhancement type UE, or a UE with time sensitive network (TSN) service); a TAC type; and a terminal type.

In one embodiment, when a radio resource control (RRC) connection is released, the base station may report an identification of the UE's last residing cell and radio coverage level to the core network. When the core network later performs paging to the UE, the paging is performed based on the UE's last residing cell, as well as the paging related characteristics information of the UE, and/or the TAC selected by the UE. The core network may also send, to the bases station, the paging message carrying the identification of the UE's last residing cell, radio coverage level, the paging related characteristics information of the UE, and/or the TAC selected by the UE. The base station may perform the paging resource configuration accordingly.

Figure 7:
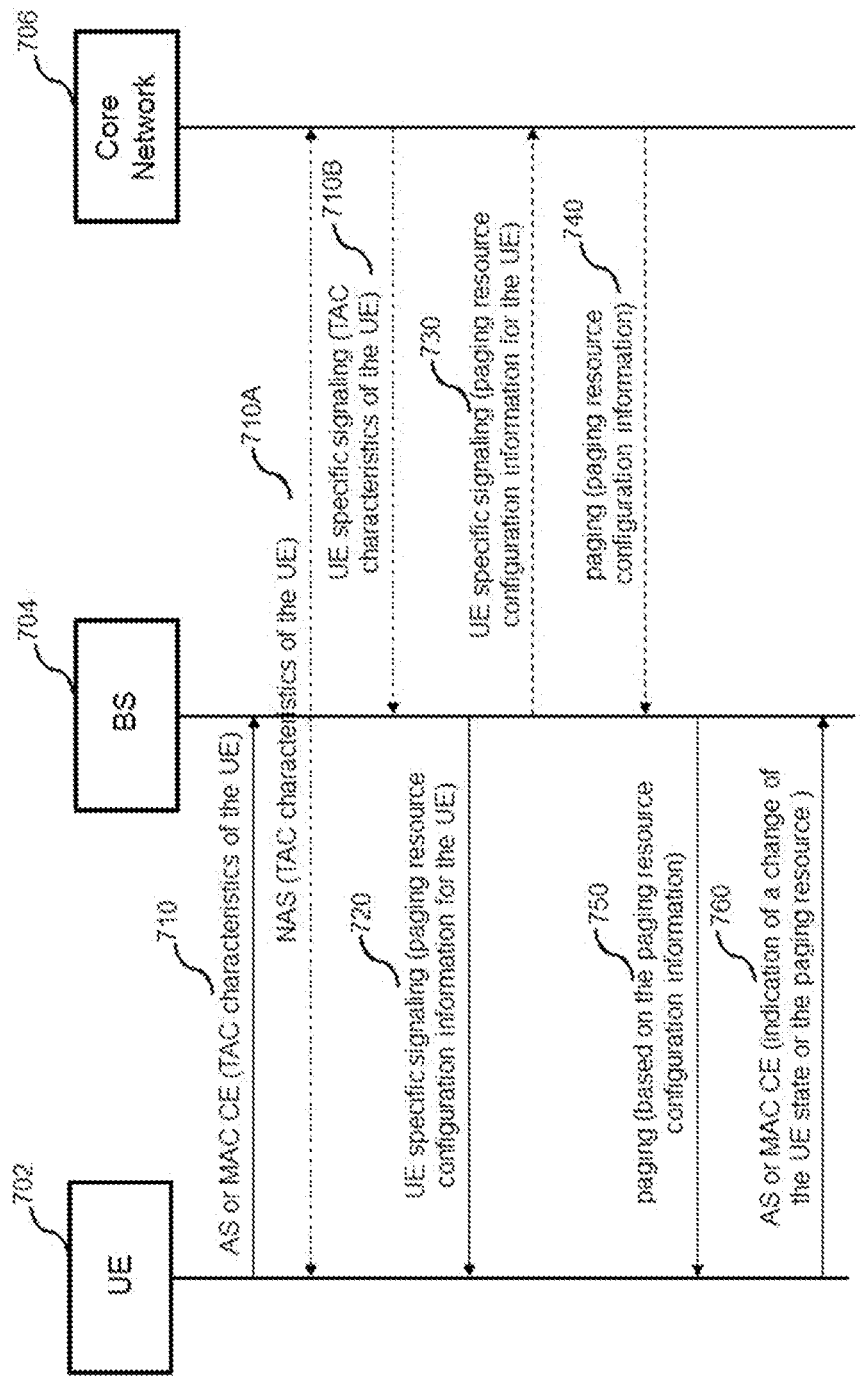
FIG. 7 illustrates an exemplary method for paging resource configuration based on UE specific signaling, in accordance with some embodiments of the present disclosure.

In a second embodiment, a BS may configure UE specific paging resources based on TAC characteristics. FIG. 7 illustrates an exemplary method for paging resource configuration based on UE specific signaling, in accordance with some embodiments of the present disclosure. As shown in FIG. 7, the UE 702 may transmit an access stratum (AS) signaling or a medium access control channel element (MAC CE) to the BS 704, at operation 710. The AS signaling or MCE CE may carry paging related information or status information of the UE. The AS signaling may comprise at least one of: a RRC connection release request of the UE, a RRC connection release confirmation message, a radio resource control (RRC) message Msg5, a capability information of the UE, an auxiliary information of the UE, etc. The status information of the UE may comprise information about at least one of: a moving speed status indication (low, medium, high, etc.), a strongest neighbor cell of the UE, a prediction of a movement path or trajectory of the UE, historical information of connection states of the UE, etc.

Alternative to operation 710, the UE 702 and the core network 706 may negotiate about the paging related feature information of the UE at operation 710A, e.g. via non-access stratum (NAS) signaling; the core network 706 then sends the paging related feature information of the UE to the base station 704 through a UE-specific signaling at operation 710B. This is to facilitate subsequent paging by the base station, or AI processing at the base station.

At operation 720, the base station 704 transmits paging resource configuration information to the UE 702 through a UE-specific signaling. At operation 730, the base station 704 sends the paging resource configuration information configured for the UE 702 to the core network 706, through a UE-specific signaling. At operation 740, the core network 706 pages the UE 702, where a paging message is sent to the base station 704 within the range determined based on the paging resource configuration information indicated by the base station 704 through the UE-specific signaling. The paging message may carry the paging resource configuration information configured for the UE 702.

In an alternative embodiment, the base station 704 may store the paging resource configuration information configured for the UE 702. In that case, operations 730 and 740 may be omitted.

At operation 750, after the base station 704, e.g. an eNB, finds out that a cell is configured with paging resource configuration information for the UE 702, the base station 704 sends a paging message to page the UE 702 based on the paging resource configuration information. When the UE 702 resides in a cell configured with the paging resource configuration information, the UE 702 may monitor and receive the paging message based on the paging resource configuration information. Otherwise, the base station 704 may page the UE based on each paging resource; and the UE may monitor paging in accordance with each paging resource.

At operation 760, after the UE 702 is configured with a specific paging resource, and when the UE's paging feature or the UE state changes, the UE may transmit a notification to the base station about these changes or request an update or release of the specific paging resource. The base station may re-configure or release the specific paging resource of the UE based on the notification from the UE.

The notification may be implicitly notified to the base station during a subsequent establishment of a wireless connection between the UE and the base station. For example, when the UE initiates service establishment in a new cell with a cell ID configured with the updated specific paging resource, the base station can release the paging specific resources of the previous cell and re-allocate paging specific resources in the new cell.

The TAC characteristics of the UE comprises at least one of the following: an indication that the UE is stationary; an indication that the UE is slowly moving; a movement trajectory of the UE; historical cells passed by the UE; a movement direction of the UE; a movement speed of the UE; and a type of service of the UE. The TAC characteristics of the UE may be utilized to estimate information related to at least one of: a range for paging the UE; a position of the UE; a type of the UE (e.g. a NR Light UE, a coverage enhancement type UE, or a UE with time sensitive network (TSN) service); a TAC type; and a terminal type.

The base station configures different paging resources to the UE, via UE specific signaling. The paging resources comprise information related to at least one of: a first search space of the UE; a radio network temporary identifier (RNTI) used in the first search space; a second search space of the UE; and a radio network temporary identifier (RNTI) used in the second search space. For each of the first search space and the second search space, the paging resource configuration comprises information related to at least one of: a starting position for monitoring a physical downlink control channel (PDCCH) in the search space; a maximum number of repetitions of the PDCCH; a time interval for monitoring the PDCCH in the search space; and information for determining the time interval.

The monitoring of the second search space may be triggered implicitly or explicitly by the scheduling in the first search space. For example, after the UE receives the scheduling message in the first search space, the UE starts monitoring the second search space. Alternatively, after the UE receives the scheduling message in the first search space, and receives an indication for monitoring the second search space, the UE starts monitoring the second search space. The indication may be carried by the scheduling message or a message transmitted on a scheduling resource of the first search space.

In on embodiment, the starting position of the second search space may be determined based on one of the following manners, when the UE starts to monitor the second search space. In a first manner, the starting position of the second search space may be the same as a starting position of a next first search space when no PDCCH was detected in the previous first search space. In a second manner, the starting position of the second search space may be determined by adding a predetermined time offset to a starting position of a subsequent first search space. In a third manner, the starting position of the second search space may be determined by adding a predetermined time offset to an end position of a subsequent first search space. In a fourth manner, the starting position of the second search space may be determined by adding a predetermined time offset to an end position of monitoring a message transmitted on a scheduling resource in a subsequent first search space.

Figure 8:
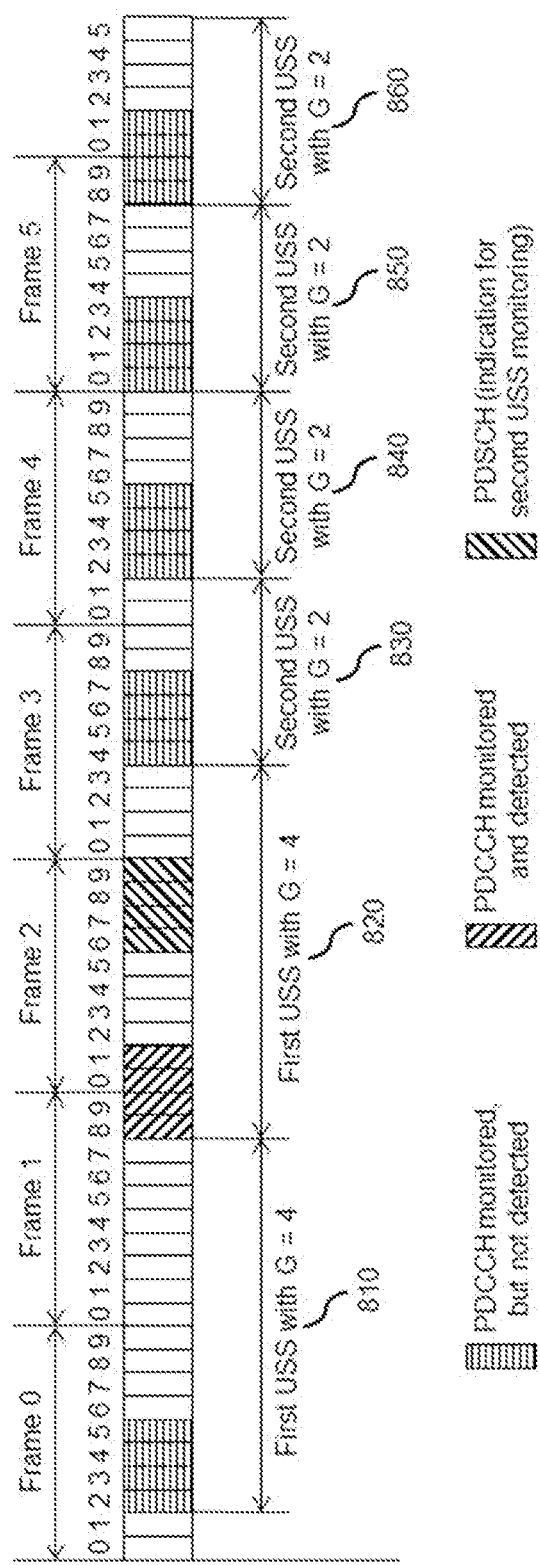
FIG. 8 illustrates an exemplary method for resource configuration related to search space monitoring, in accordance with some embodiments of the present disclosure.

FIG. 8 illustrates an exemplary method for resource configuration related to search space monitoring, in accordance with some embodiments of the present disclosure. As shown in FIG. 8, the UE first monitors PDCCH in the first search space, where the monitoring interval of the PDCCH monitoring is equal to 4 times the length of the PDCCH monitoring.

The monitoring of the first search space is performed periodically, at operations 810 and 820. When the UE detects a PDCCH within the first search space (during operation 820), and when the PDSCH message scheduled by the PDCCH carries an indication for monitoring the second search space, the UE starts monitoring the second search space, i.e. monitoring PDCCH in the second search space.

The monitoring of the second search space is also performed periodically, at operations 830, 840, 850, 860. In the second search space, the monitoring interval of the PDCCH monitoring is equal to 2 times the length of the PDCCH monitoring. In this embodiment, the start position of the PDCCH monitoring in the second search space is the same as a start position of PDCCH monitoring in the next first search space, if no PDCCH was detected in the previous first search space.

Figure 9:
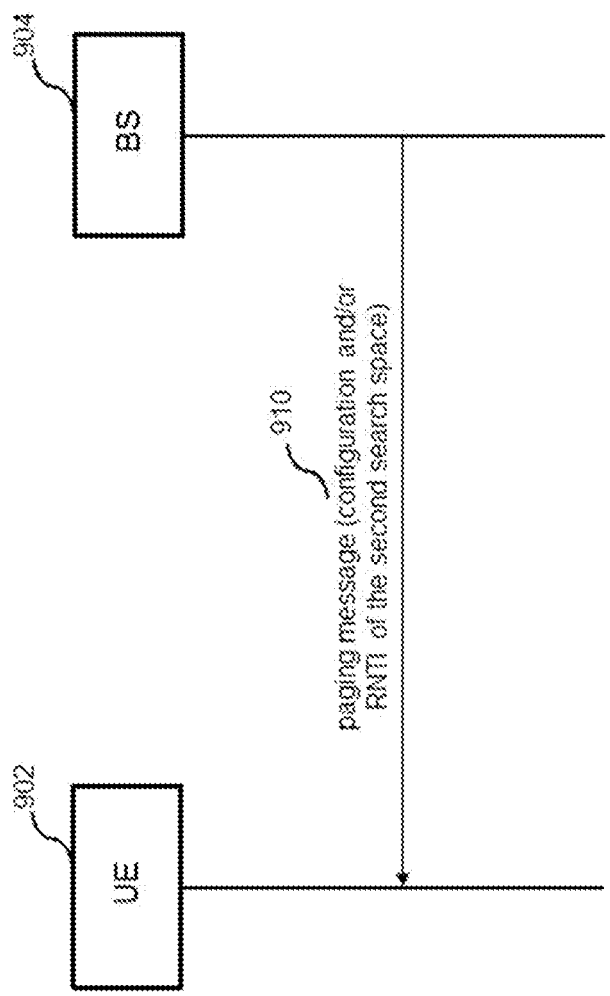
FIG. 9 illustrates an exemplary method for configuring a second search space based on a paging message transmitted in a first search space, in accordance with some embodiments of the present disclosure.

The second search space of the UE and the RNTI used in the second search space may also be configured by a scheduling message of the first search space of the UE or a message transmitted on a scheduling resource, as shown in FIG. 9. FIG. 9 illustrates an exemplary method for configuring a second search space based on a paging message transmitted in a first search space, in accordance with some embodiments of the present disclosure. As shown in FIG. 9, the BS 904 configures the configuration information and/or RNTI used in the second search space, through a paging message transmitted at operation 910 on a scheduling resource of the first search space to the UE 902.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, the method comprising:
    transmitting a first message to a wireless communication node, wherein the first message comprises information related to tracking area code (TAC) characteristics of the wireless communication device;
    receiving a second message from the wireless communication node, wherein the second message comprises information about a paging resource configuration for the wireless communication device, wherein the paging resource configuration comprises information related to at least one of: a first search space of the wireless communication device; a radio network temporary identifier (RNTI) associated with the first search space; a second search space of the wireless communication device; or a radio network temporary identifier (RNTI) associated with the second search space;
    receiving a third message based on the paging resource configuration;
    monitoring a physical downlink control channel (PDCCH) in the first search space, wherein the third message is received based on monitoring the PDCCH; and
    monitoring a PDCCH in the second search space based on an indication carried by at least one of: the third message, downlink control information (DCI) of the PDCCH in the first search space or a physical downlink shared channel (PDSCH) scheduled in the first search space.

2. The method of claim 1, wherein
    the first message comprises: an access stratum (AS) signaling, a medium access control channel element (MAC CE), or a non-access stratum (NAS) signaling; the AS signaling comprises at least one of: a radio resource control (RRC) message, a user equipment (UE) RRC connection release request, a UE RRC connection release confirmation, a capability information of the wireless communication device, or an auxiliary information of the wireless communication device; the second message comprises a signaling specific to the wireless communication device; and the third message comprises a paging message, or
    the information related to TAC characteristics of the wireless communication device comprises information related to at least one of: whether the wireless communication device is stationary; whether the wireless communication device has a slow movement; a movement path of the wireless communication device; historical cells that the wireless communication device ever comped on; a movement direction of the wireless communication device; a movement speed of the wireless communication device; a type of service carried by the wireless communication device; a position of the wireless communication device; an indication that the wireless communication device is coverage enhancement (CE) restricted; an indication that the wireless communication device is CE-ModeB restricted; an indication that the wireless communication device is with lower power class; an indication that the wireless communication device is a reduced capability NR device; an indication that the wireless communication device is a time sensitive communication (TSC) device; an indication that the wireless communication device is a device supporting CE or in CE; a TAC identification; a type or class identification of the wireless communication device; an identification of a strongest neighbor cell of the wireless communication device; a prediction information of a moving path of the wireless communication device; or historical information of connection states of the wireless communication device.

3. The method of claim 1, wherein
    the information related to TAC characteristics of the wireless communication device is utilized to estimate information related to a range for paging associated with the wireless communication device.

4. The method of claim 1, further comprising:
    transmitting a fourth message to the wireless communication node, wherein the fourth message comprises updated information related to the TAC characteristics of the wireless communication device; and
    receiving a fifth message from the wireless communication node, wherein the fifth message comprises information about an updated paging resource configuration for the wireless communication device.

5. The method of claim 1, wherein for each of the first search space and the second search space, the paging resource configuration comprises information related to at least one of: a starting position for monitoring a physical downlink control channel (PDCCH) in the first search space and the second search space; a maximum number of repetitions of the PDCCH; a time interval for monitoring the PDCCH in the first search space and the second search space; or information for determining the time interval.

6. The method of claim 1, wherein a starting position for monitoring the PDCCH in the second search space is determined based on at least one of: a starting position of a subsequent first search space; an end position of the subsequent first search space; an end position of monitoring a message transmitted on a scheduling resource in the subsequent first search space; or a predetermined time offset.

7. A method performed by a wireless communication node, the method comprising:
    receiving a first message from a wireless communication device, wherein the first message comprises information related to tracking area code (TAC) characteristics of the wireless communication device;
    transmitting a second message to the wireless communication device, wherein the second message comprises information about a paging resource configuration for the wireless communication device, wherein the paging resource configuration comprises information related to at least one of: a first search space of the wireless communication device; a radio network temporary identifier (RNTI) associated with the first search space; a second search space of the wireless communication device; or a radio network temporary identifier (RNTI) associated with the second search space; and transmitting a third message based on the paging resource configuration, wherein the third message is transmitted to the wireless communication device when the wireless communication device monitors a physical downlink control channel (PDCCH) in the first search space; and the wireless communication device monitors a PDCCH in the second search space based on an indication carried by at least one of: the third message or a physical downlink shared channel (PDSCH) scheduled in the first search space.

8. The method of claim 7, wherein:
the first message comprises: an access stratum (AS) signaling, a medium access control channel element (MAC CE), or a non-access stratum (NAS) signaling; the AS signaling comprises at least one of: a radio resource control (RRC) message, a UE RRC connection release request, a UE RRC connection release confirmation, a capability information of the wireless communication device, or an auxiliary information of the wireless communication device; the second message comprises a signaling specific to the wireless communication device; and the third message comprises a paging message, or
the information related to TAC characteristics of the wireless communication device comprises information related to at least one of: whether the wireless communication device is stationary; whether the wireless communication device has a slow movement; a movement path of the wireless communication device; historical cells passed by the wireless communication device; a movement direction of the wireless communication device; a movement speed of the wireless communication device; a type of service carried by the wireless communication device;
a position of the wireless communication device; an indication that the wireless communication device is coverage enhancement (CE) restricted; an indication that the wireless communication device is CE-ModeB restricted; an indication that the wireless communication device is with lower power class; an indication that the wireless communication device is a reduced capability NR device; an indication that the wireless communication device is a time sensitive communication (TSC) device; an indication that the wireless communication device is a device supporting CE or in CE; a TAC identification; a type or class identification of the wireless communication device; an identification of a strongest neighbor cell of the wireless communication device; a prediction information of a moving path of the wireless communication device; or historical information of connection states of the wireless communication device.

9. The method of claim 7, wherein
the information related to TAC characteristics of the wireless communication device is utilized to estimate information related to a range for paging associated with the wireless communication device.

10. The method of claim 7, further comprising:
receiving a fourth message from the wireless communication device, wherein the fourth message comprises updated information related to the TAC characteristics of the wireless communication device; and
transmitting a fifth message to the wireless communication device, wherein the fifth message comprises information about an updated paging resource configuration for the wireless communication device.

11. The method of claim 7, wherein for each of the first search space and the second search space, the paging resource configuration comprises information related to at least one of: a starting position for the wireless communication device to monitor a physical downlink control channel (PDCCH) in the first search space and the second search space; a maximum number of repetitions of the PDCCH; a time interval for the wireless communication device to monitor the PDCCH in the first search space and the second search space; or information for determining the time interval.

12. The method of claim 7, wherein a starting position for the wireless communication device to monitor the PDCCH in the second search space is determined based on at least one of: a starting position of a subsequent first search space when no PDCCH was detected in the first search space by the wireless communication device; an end position of the subsequent first search space; an end position for the wireless communication device to monitor a message transmitted on a scheduling resource in the subsequent first search space; or a predetermined time offset.

13. A wireless communication device comprising a processor configured to:
transmit a first message to a wireless communication node, wherein the first message comprises information related to tracking area code (TAC) characteristics of the wireless communication device;
receive a second message from the wireless communication node, wherein the second message comprises information about a paging resource configuration for the wireless communication device, wherein the paging resource configuration comprises information related to at least one of: a first search space of the wireless communication device; a radio network temporary identifier (RNTI) associated with the first search space; a second search space of the wireless communication device; or a radio network temporary identifier (RNTI) associated with the second search space;
receive a third message based on the paging resource configuration;
monitor a physical downlink control channel (PDCCH) in the first search space, wherein the third message is received based on monitoring the PDCCH; and
monitor a PDCCH in the second search space based on an indication carried by at least one of: the third message, downlink control information (DCI) of the PDCCH in the first search space or a physical downlink shared channel (PDSCH) scheduled in the first search space.

14. The wireless communication device of claim 13, wherein
the first message comprises: an access stratum (AS) signaling, a medium access control channel element (MAC CE), or a non-access stratum (NAS) signaling; the AS signaling comprises at least one of: a radio resource control (RRC) message, a user equipment (UE) RRC connection release request, a UE RRC connection release confirmation, a capability information of the wireless communication device, or an auxiliary information of the wireless communication device; the second message comprises a signaling specific to the wireless communication device; and the third message comprises a paging message, or
the information related to TAC characteristics of the wireless communication device comprises information related to at least one of: whether the wireless communication device is stationary; whether the wireless communication device has a slow movement; a movement path of the wireless communication device; historical cells that the wireless communication device ever comped on; a movement direction of the wireless communication device; a movement speed of the wireless communication device; a type of service carried by the wireless communication device; a position of the wireless communication device; an indication that the wireless communication device is coverage enhancement (CE) restricted; an indication that the wireless communication device is CE-ModeB restricted; an indication that the wireless communication device is with lower power class; an indication that the wireless communication device is a reduced capability NR device; an indication that the wireless communication device is a time sensitive communication (TSC) device; an indication that the wireless communication device is a device supporting CE or in CE; a TAC identification; a type or class identification of the wireless communication device; an identification of a strongest neighbor cell of the wireless communication device; a prediction information of a moving path of the wireless communication device; or historical information of connection states of the wireless communication device.

15. The wireless communication device of claim 13, wherein the information related to TAC characteristics of the wireless communication device is utilized to estimate information related to a range for paging associated with the wireless communication device.

16. The wireless communication device of claim 13, wherein the processor is further configured to:

transmit a fourth message to the wireless communication node, wherein the fourth message comprises updated information related to the TAC characteristics of the wireless communication device; and receive a fifth message from the wireless communication node, wherein the fifth message comprises information about an updated paging resource configuration for the wireless communication device.

\* \* \* \* \*